United States Patent [19]

Okuda et al.

[11] Patent Number: 5,009,209

[45] Date of Patent: Apr. 23, 1991

[54] IGNITION TIMING CONTROL CIRCUIT FOR AN INTERNAL COMBUSTION ENGINE

[75] Inventors: Hiroshi Okuda; Masayuki Ozawa, both of Himeji, Japan

[73] Assignee: Mitsubishi Denki Kabushiki Kaisha, Tokyo, Japan

[21] Appl. No.: 476,231

[22] Filed: Feb. 7, 1990

[51] Int. Cl.$^5$ .............................................. F02P 5/155
[52] U.S. Cl. .................................... 123/415; 123/416; 123/427
[58] Field of Search ...................... 123/415, 416, 427

[56] References Cited

U.S. PATENT DOCUMENTS

| 3,759,232 | 9/1973 | Wahl et al. | 123/589 |
| 3,923,022 | 12/1975 | Scholl | 123/415 |
| 4,210,111 | 7/1980 | Hattori et al. | 123/416 |
| 4,520,781 | 6/1985 | Nishida | 123/416 |
| 4,527,522 | 7/1985 | Cerny | 123/416 |

FOREIGN PATENT DOCUMENTS

0047161 3/1983 Japan .................................. 123/416

Primary Examiner—Tony M. Argenbright
Assistant Examiner—Robert E. Mates
Attorney, Agent, or Firm—Sughrue, Mion, Zinn, Macpeak and Seas

[57] ABSTRACT

An ignition timing control circuit for an internal combustion engine of a ring gear tooth counting type includes a throttle sensor for sensing the load condition of the engine and generating an output voltage representative of the sensed load condition, a reference-signal generator for generating a reference signal, a clock pulse generator in the form of a gear-signal pick-up coil for generating clock pulses based on the rotational position of a ring gear, a counter operable to start the counting of the clock pulses generated by the clock pulse generator when the reference-signal generator generates a reference signal, the counter outputting a digitalized output representative of the number of the counted clock pulses, a D/A converter for converting the digitalized output of the counter into an analog voltage having a stepped form, an integrator for integrating and smoothing out the stepped output voltage of the D/A converter, and a comparator for comparing the output voltage of the integrator and the output voltage of the throttle sensor and generating an output signal for controlling the ignition timing of the engine in accordance with the result of comparison. In one embodiment, the integrator has a fixed time constant and comprises a capacitor. In another embodiment, the integrator has a variable time constant and comprises a plurality of capacitors connected to the D/A converter through a switch for changing the total capacitance of the integrator in response to the output of the counter.

13 Claims, 8 Drawing Sheets

INPUT VOLTAGE AT POSITIVE INPUT TERMINAL OF COMPARATOR 12 DURING LOW-SPEED OPERATION

Vs FOR SMALL THROTTLE OPENING

Vs FOR LARGE THROTTLE OPENING

→ CRANK ANGLE

FIG. 4(g)

OUTPUT OF COMPARATOR 12

→ CRANK ANGLE

FIG. 4(h)

INPUT VOLTAGE AT POSITIVE INPUT TERMINAL OF COMPARATOR 12 DURING HIGH-SPEED OPERATION

Vs FOR SMALL THROTTLE OPENING

Vs FOR LARGE THROTTLE OPENING

→ CRANK ANGLE

FIG. 4(i)

OUTPUT OF COMPARATOR 12

CRANK ANGLE

IGNITION TIMING CONTROL CIRCUIT FOR AN INTERNAL COMBUSTION ENGINE

BACKGROUND OF THE INVENTION

The present invention relates to an ignition timing control circuit for an internal combustion engine which is capable of controlling the ignition timing of the engine in a fine and precise manner, thereby ensuring the smooth operation thereof over substantially the entire operating range of the engine.

Figure 5:
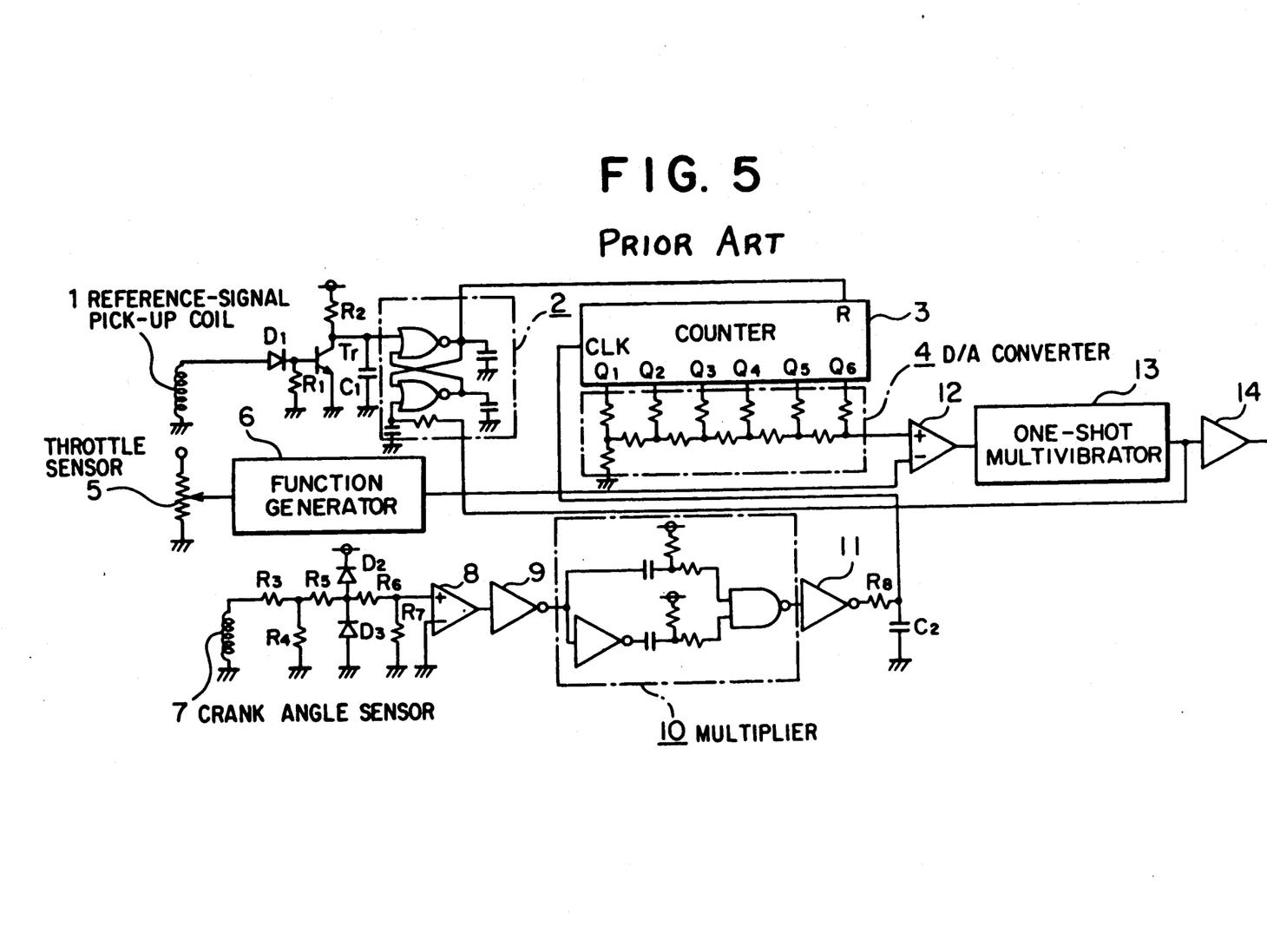
FIG. 5 is a view similar to FIG. 1, but showing a known ignition timing control circuit.

FIG. 5 shows a known ignition timing control circuit for an internal combustion engine. In this figure, a reference-signal pick-up coil 1 has one end coupled through a diode $D_1$ to the base of a transistor Tr and the other end grounded, and generates a reference signal in the form of a pulse signal as a magneto generator (not shown) rotates. A resistor $R_1$ has one end coupled to the cathode of the diode $D_1$ and the other end grounded. A resistor $R_2$ is coupled in series to the collector of a transistor Tr. A capacitor $C_1$ is coupled at one end to the collector of the transistor Tr and grounded at the other end. The transistor Tr, the resistor $R_2$ and the capacitor $C_1$ together constitute a waveform shaping circuit. A flip-flop 2 including two NOR gates, a resistor and three capacitors has a set input terminal coupled to one end of the capacitor $C_1$. The reference-signal pick-up coil 1, the waveform shaping circuit and the flip-flop 2 together constitute a reference signal generating means.

A counter 3 has a clock input terminal CLK coupled to a junction between one end of a resistor $R_8$ and one end of a capacitor $C_2$, a reset terminal R coupled to the flip-flop 2 and a plurality of output terminals $Q_1 \sim Q_6$. A digital to analog (D/A) converter 4 in the form of a rudder circuit including a resistance circuit network has a plurality (six in the illustrated example) of input terminals coupled to the corresponding output terminal $Q_1 \sim Q_6$ of the counter 3.

Figure 7:
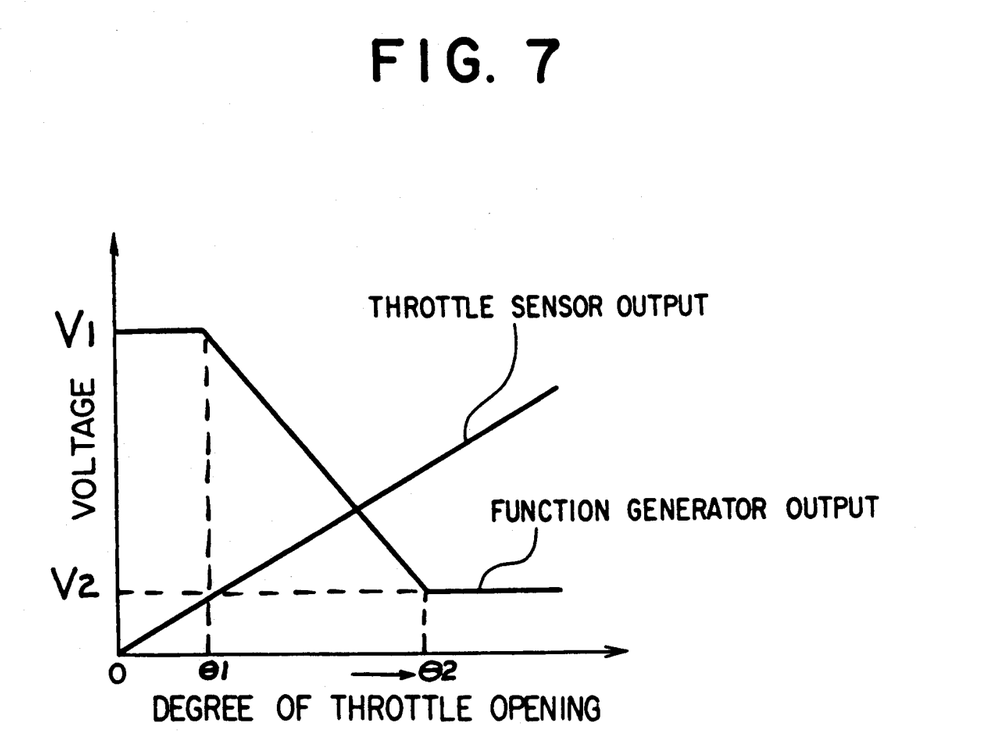
FIG. 7 is a graphical representation showing the output characteristic of a throttle sensor and the output characteristic of a function generator in relation to the opening degree of a throttle valve.

A load sensor 5 in the form of a throttle sensor comprising a resistor has one end coupled to the source of electricity and the other end grounded and generates an output voltage corresponding to the opening degree of a throttle valve (not shown). For example, the output voltage of the throttle sensor 5 varies in proportion to the opening degree of the throttle valve, as shown in FIG. 7. A function generator 6 is coupled to the throttle sensor 5 for generating a voltage as a function of the output voltage of the throttle sensor 5. The output voltage of the function generator 6 changes in relation to the degree of opening of the throttle valve in the manner as shown in FIG. 7. For example, the output voltage Vs of the function generator 6 takes a first constant value $V_1$ when the opening degree of the throttle valve is in the range of from 0 to a first prescribed degree $\theta_1$, then decreases as the opening degree of the throttle valve increases from the first prescribed degree $\theta_1$ to a second prescribed degree $\theta_2$, and finally takes a second constant value $V_2$ when the opening degree of the throttle value further increases from the second prescribed degree $\theta_2$, as clearly shown in FIG. 7.

A crank angle sensor in the form of a gear-signal pick-up coil 7 is disposed adjacent a ring gear operatively connected with the crankshaft of the engine for generating an output voltage corresponding to the rotational position of the ring gear, i.e., crank angle of the engine crankshaft. The gear-signal pick-up coil 7 has one end coupled to a resistor $R_3$ and the other end grounded. A resistor $R_4$ has one end coupled to the other end of the resistor $R_3$ and the other end grounded. A resistor $R_5$ has one end coupled to one end of a resistor $R_4$ and the other end coupled to a junction between the anode of the diode $D_2$ and the cathode of the diode $D_3$. The cathode of the diode $D_2$ is coupled to the source of electricity, and the anode of the diode $D_3$ is grounded. The resistor $R_6$ has one end coupled to the other end of the resistor $R_5$ and the other end coupled to the non-inverted input terminal of a comparator 8 which will be described later in detail. A resistor $R_7$ has one end coupled to the other end of the resistor $R_6$ and the other end grounded. The comparator 8 has an inverted input terminal grounded. An inverted amplifier 9 is coupled to the output terminal of the comparator 8. A multiplier 10 in the form of a twofold multiplier 10 including an inverted amplifier, resistors, capacitors and a NAND gate is coupled to the output terminal of the inverted amplifier 9. An inverted amplifier 11 has an input terminal coupled to the twofold multiplier 10 and an output terminal coupled to one end of a resistor $R_8$ which is coupled at the other end to one end of the capacitor $C_2$ which is grounded at the other end. The junction between the resistor $R_8$ and the capacitor $C_2$ is coupled to the clock input terminal CLK of the counter 3. Thus, the gear-signal pick-up coil 7, resistors $R_3$, $R_4$, $R_5$, $R_6$, $R_7$ and $R_8$, diodes $D_2$ and $D_3$, comparator 8, inverted amplifier 9, multiplier 10, inverted amplifier 11 and capacitor $C_2$ together constitutes a clock pulse generator.

A comparator 12 has a non-inverted or positive input terminal coupled to the output side of the D/A converter 4 and an inverted or negative input terminal coupled to the output side of the function generator 6. A one-shot multivibrator 13 has an input side coupled to the output terminal of the comparator 12 and an output side coupled to the reset terminal of the flip-flop 2 and to an amplifier 14 which is connected with an ignition device, i.e., a primary side of an ignition coil.

FIGS. 6(a) through 6(g) illustrate the operational waveform of the various portions of the known ignition timing control circuit of FIG. 5, which will be described later in detail.

Figure 6A:
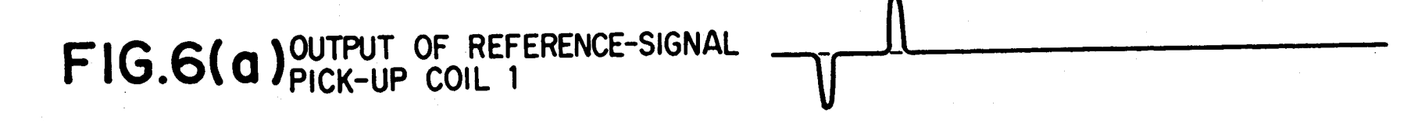
FIGS. 6(a) through 6(g) are diagrammatic views similar to FIG. 2, but showing the waveforms of essential operational elements of FIG. 5.
Figure 6B:
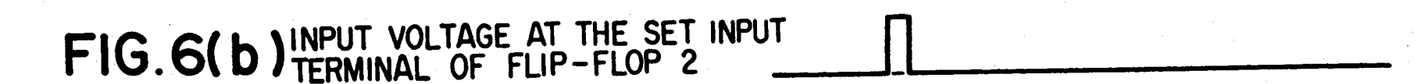
Figure 6C:
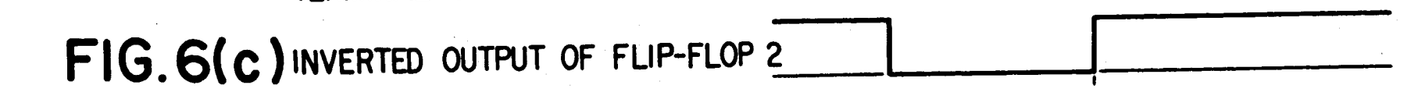

With the known ignition timing control circuit as constructed above, the reference-singal pick-up coil 1 generates a pulse signal containing positive and negative pulses (only two pulses are illustrated here for the sake of simplification) at predetermined rotational positions of the rotary shaft of the magneto generator (not shown), as shown in FIG. 6(a), as the magneto generator rotates. The positive pulses of the pulse signal are imposed through the diode $D_1$ on the base of the transistor Tr so that they are waveform shaped by the transistor Tr, the resistor $R_2$ and the capacitor $C_1$ to provide corresponding rectangular-shaped pulses (only one is shown in FIG. 6(b)), which are input to the set input terminal of the flip-flop 2, thus switching it. As a result, the output at the inverted output terminal of the flip-flop 2 goes to the low level, as shown in FIG 6(c), so that the counter 3 starts counting.

Figure 6D:
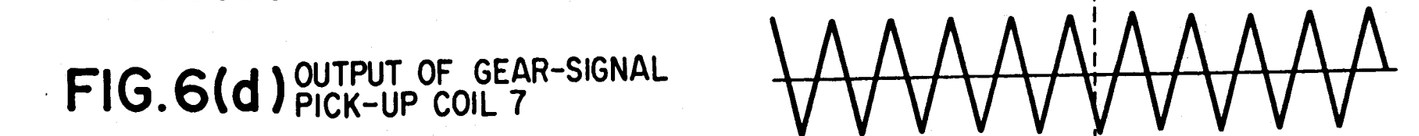
Figure 6E:
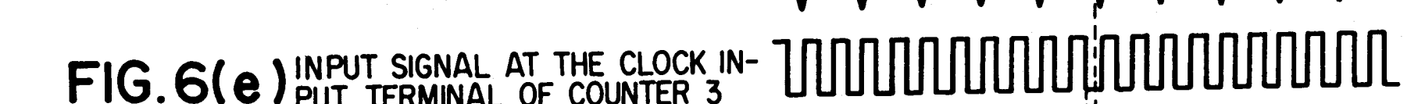
Figure 6F:
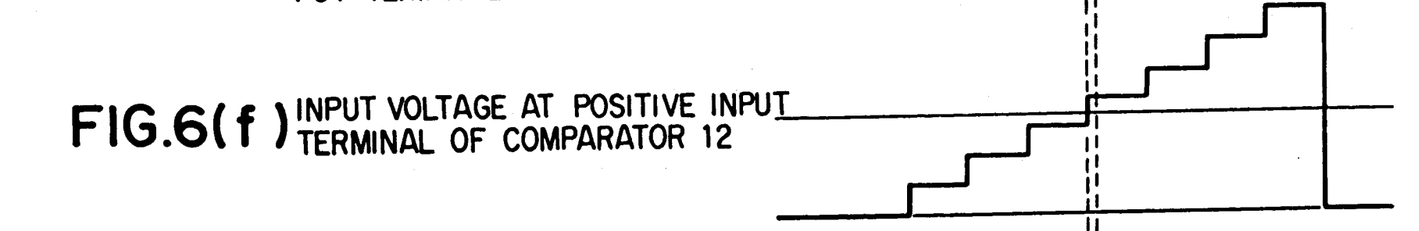

On the other hand, the gear-signal pick-up coil 7 generates a wave signal having a saw-tooth waveform, as shown in FIG. 6(d), as the ring gear (not shown) operatively connected with the crankshaft (not shown) rotates. The saw-tooth wave signal thus generated contains triangular-shaped pulses each corresponding to the respective one of the teeth internally formed on the ring gear. The saw-tooth signal of the gear-signal pick-up coil 7 is imposed on the comparator 8 where it is waveform shaped and then supplied through the inverted amplifier 9 to the twofold multiplier 10 which provides rectangular-shaped clock pulses having a frequency two times greater than that of the saw-tooth wave signal, as shown in FIG. 6(e). The clock pulses thus produced are input to the clock input terminal CLK of the counter 3 so that the counter 3 counts the number of the clock pulses thus input and produces as digitalized signal in the form of a binary number repesentative of the counted clock pulse number at the outpout terminals $Q_1 \sim Q_6$ each time when the number of the input clock pulses counted reaches six distinct predetermined levels. For example, the output terminal $Q_1 \sim Q_6$ correspond respectively to six different but successive counting levels, the terminal $Q_1$ corresponding to the lowest one and the terminal $Q_6$ to the highest one. The digitilized output thus produced is fed to the D/A converter 4 where it is converted into an analog voltage of stepped form, as shown in FIG. 6(f), which is then imposed on the non-inverted input terminal of the comparator 12. On the other hand, imposed on the inverted input terminal of the comparator 12 is the output voltage Vs of the function generator 6 to which the output voltage of the throttle sensor 5 is input.

Figure 6G:
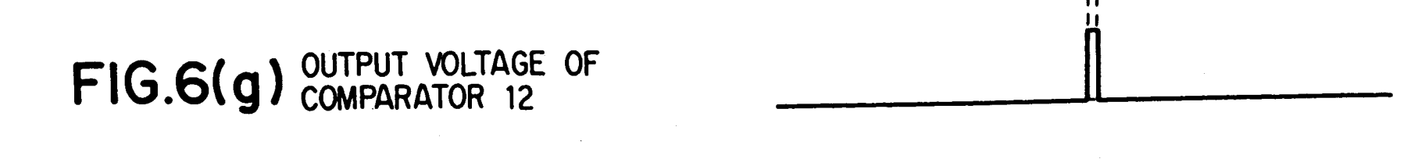

Accordingly, the stepped voltage supplied to the comparator 12 from the D/A converter 4 is compared with the output voltage Vs from the function generator 6 so that when the stepped voltage increases to a level higher than the function generator output voltage Vs, the output of the comparator 12 changes from the low to the high level, as shown in FIG. 6(g). The high-level output of the comparator 12 triggers the one-shot multivibrator 13 to produce a waveform-shaped pulse signal which is in turn amplified by the amplifier 14 to provide an ignition timing control signal which is fed to the unillustrated ignition coil. At the same time, the output signal of the one-shot multivibrator 13 is also input to the reset input terminal on the flip-flop 2 so that the flip-flop 2 is reset to return the output thereof to the high level. As a result, the high level output of the flip-flop 2 is input to the reset terminal R of the counter 3 whereby the counter 3 is reset to stop counting and placed in a condition ready for the next counting.

With the above-described known ignition timing control circuit of the gear counting type utilizing a ring gear, in which ignition timing is controlled by detecting the crank angle of the engine, however, the output signal of the gear signal pick-up coil 7 containes a saw-tooth wave having a relatively large angular wave width which corresponds to the shape or angular width of the respective internal teeth of the ring gear. Therefore, it is extremely difficult to obtain a wave signal having a continuously changing waveform due to restrictions on the shape and arrangement of the ring gear teeth. Thus, ignition timing can only be controlled stepwise with a relatively large angular width or distance as the output voltage Vs of the function generator 6 continuously changes. This makes it difficult for the engine to operate in a smooth manner over a wide range of engine operation from a low to high speed. Such a tendency is particularly evident when the rotational speed or load of the engine is low.

SUMMARY OF THE INVENTION

Accordingly, the present invention is intended to obviate the above-described problem of the known ignition timing control circuit.

An object of the present invention is to provide a novel and improved ignition timing control circuit for an internal combustion engine which is able to control ignition timing in a smooth and continuous manner particularly when the rotational speed or load of the engine is low.

Another object of the present invention is to provide a novel and improved ignition timing control circuit for an internal combustion engine which is able to control ignition timing in a smooth and continuous manner over a wide range of the rotational speed or load condition of the engine.

To achieve the above objects, according to the present invention, there is provided an ignition timing control circuit for an internal combustion engine comprising:

a load sensor for sensing the load condition of the engine and generating an output signal representative of the sensed load condition;

reference-signal generating means for generating a reference signal;

a clock pulse generator for generating clock pulses in accordance with the rotation of the engine;

a counter operable to start the counting of the clock pulses generated by the clock pulse generator when the reference-signal generator generates a reference signal, the counter outputting a digitalized output representative of the number of the counted clock pulses;

a digital to analog converter for converting the digitalized output of the counter into an analog voltage having a stepped waveform:

an integrator connected to the digitial to analog converter for integrating and smoothing out the stepped output voltage of the digital to analog converter; and a comparator for comparing the output voltage of the integrator and the output voltage of the load sensor and generating an output signal for controlling the ignition timing of the engine in accordance with the results of comparison.

In one embodiment, the integrator has a fixed time constant and comprises a capacitor which has one terminal coupled to the output terminal of the digital to analog converter and the other terminal grounded.

In another embodiment, the integrator has a variable time constant and comprises a plurality of capacitors which are connected to the counter through a switch. The capacitors have one terminal commonly grounded and the other terminal coupled with the corresponding output terminals of the counter through the switch. The switch comprises a plurality of switch elements for sequentially connecting the corresponding capacitors to the corresponding output terminals of the counter when the counter generates output signals at its corresponding output terminals.

The above and other objects, features and advantages of the present invention will become apparent from the following detailed description of a few presently preferred embodiments of the invention taken in conjuction with the accompanying drawings.

DESCRIPTION OF THE PREFERRED EMBODIMENTS

The present invention will now be described in detail with reference to a few presently preferred embodiments thereof as illustrated in the accompanying drawings.

Figure 1:
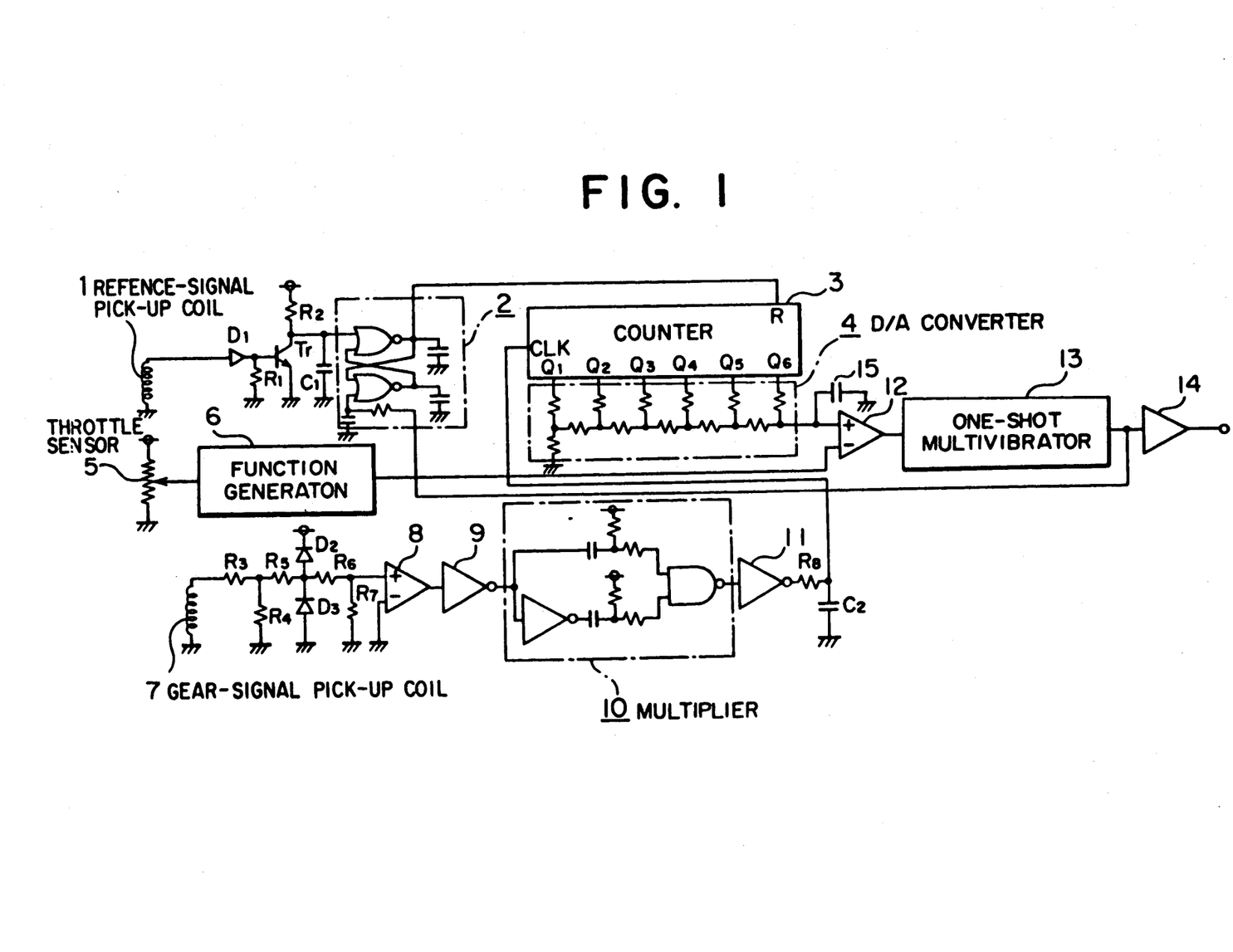
FIG. 1 is a circuit diagram showing the general arrangement of an ignition timing control circuit for an engine in accordance with one embodiment of the present invention.

Referring to the drawings and first to FIG. 1, there is illustrated an ignition timing control circuit for an internal combustion engine in accordance with a first embodiment of the present invention. The ignition timing control circuit illustrated in FIG. 1 is similar in construction and operation to the known one of FIG. 5 except for the fact that an integrator 15 in the form of a capacitor is provided for smoothing out the stepped shape of the output voltage of the D/A converter 4, i.e., for changing the rectangular-shaped stepwise waveform into a smoothly curved waveform. The capacitor 15 has one end coupled to the output terminal of the D/A converter 4 and the non-inverted input terminal of the comparator 12, and the other end grounded.

FIGS. 2(a) through 2(g) illustrate the waveforms of signals generated by essential elements of FIG. 1.

Figure 2A:
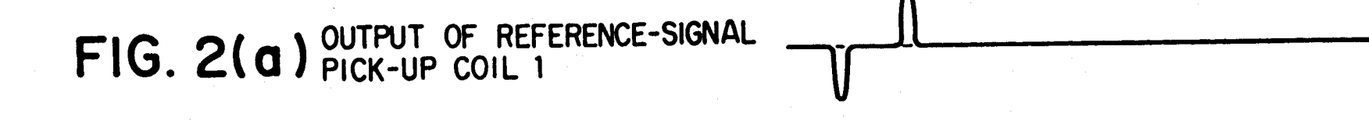
FIGS. 2(a) through 2(g) are diagramatic views showing the waveforms of essential operational elements illustrated in FIG. 1.
Figure 2B:
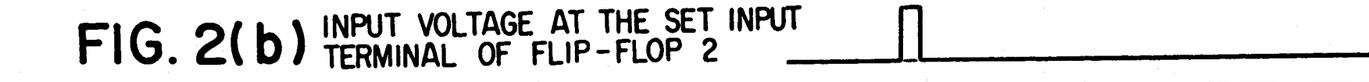
Figure 2C:
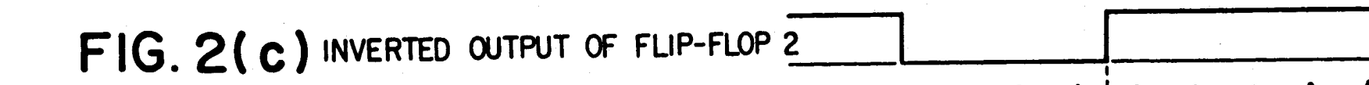

With the present ignition timing control circuit as constructed above, the reference signal generator 1 in the form of a reference signal pick-up coil generates a pulse signal including positive and negative pulses, as shown in FIG. 2(a), as a magneto generator (not shown) rotates. The positive pulses of the pulse signal are imposed through the diode $D_1$ on the base of the transistor Tr so that they are waveform shaped by the transistor Tr, the resistor $R_2$ and the capacitor $C_1$ to provide rectangular-shaped pulses, as shown in FIG. 2(b), which are imposed on the set input terminal of the flip-flop 2. As a result, the output signal at the inverted output terminal of the flip-flop 2 goes to the low level, as shown in FIG. 2(c), whereby the counter 3 is operated to start counting.

Figure 2D:
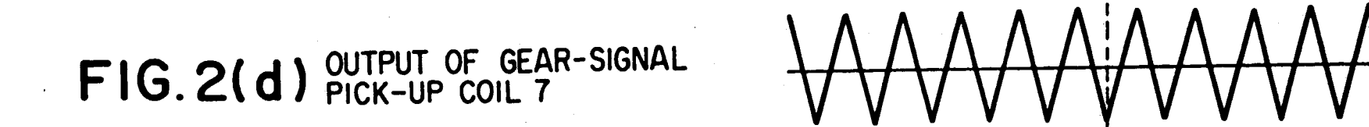
Figure 2E:
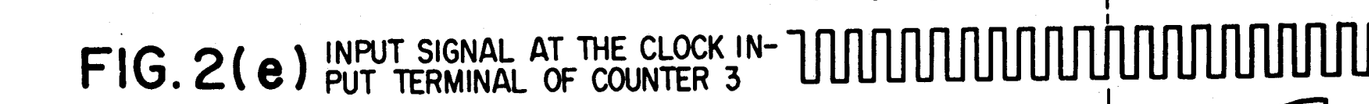
Figure 2F:
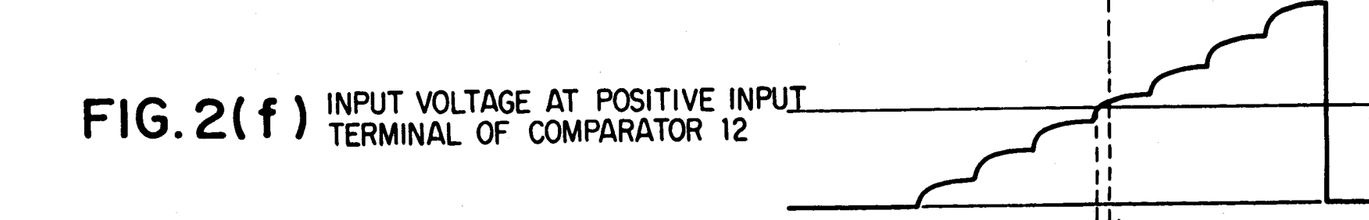

On the other hand, the crank angle sensor 7 in the form of a gear-signal pick-up coil generates a signal having a saw-tooth waveform, as shown in FIG. 2(d). The saw-tooth signal is imposed on the positive terminal of the comparator 8 where the waveform thereof is shaped and then supplied through the inversion amplifier 9 to the twofold amplification circuit 10 to provide clock pulses, as shown in FIG. 2(e), which are in turn imposed on the clock input terminal CLK of the counter 3. As the counter 3 counts the number of the input clock pulses, it generates a digitalized output in the form of a binary number representative of the number of counted clock pulses at its output terminals $Q_1 \sim Q_6$ each time when the number of input clock pulses counted reaches six predetermined distinct levels. The digitalized output is passed through the D/A converter 4 so that it is converted into an analog voltage of a stepped form which is then fed to the capacitor 15 where the stepped analog voltage is integrated so as to change from the stepped form into a continuously and smoothly changing curved form, as shown in FIG. 2(f). The smoothly changing analog voltage thus obtained through the capacitor 15 is imposed on the non-inverted input terminal of the comparator 12. Here, imposed upon the inverted input terminal of the comparator 12 is the output voltage Vs of the function generator 6 which changes in relation to the throttle opening in the manner shown in FIg. 7.

Figure 2G:
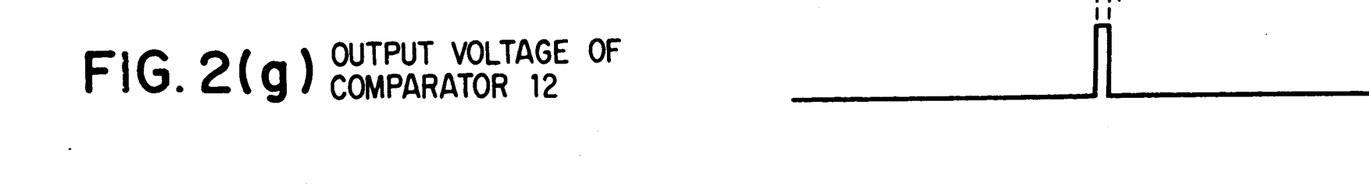

Accordingly, the analog voltage supplied from the capacitor 15 to the non-inverter input terminal of the comparator 12 is compared with the ouput voltage Vs of the function generator 6 supplied to the inverted input terminal thereof so that when the analog voltage rises above the output voltage Vs, the output of the comparator 12 changes into the high level, as shown in FIG. 2(g), whereby the one-shot multivibrator circuit 13 is triggered to provide a waveform shaped output pulse. The thus shaped output pulse is amplified by the amplifier 14 to provide an ignition timing control signal which is fed to the unillustrated ignition coil. At the same time, the output signal of the multivibrator 13 is input to the reset input terminal of the flip-flop 2 so that the flip-flop 2 is reset to return its output to the high level. Thus, the counter 3 is reset to stop counting and becomes ready for the next counting.

As described above, according to this embodiment, a smoothly changing analog voltage as shown in FIG. 2(f) is obtained which is to be imposed on the non-inverted input terminal of the comparator 12. Therefore, it is possible to continuously and hence finely control ignition timing of the engine in a smooth manner in accordance with a change in the output voltage Vs of the function generator 6.

With the above-described embodiment, however, the length in time of the width of each step of the D/A converter output, which corresponds to a specific angular distance of the crankshaft, varies in accordance with the rotational speed of the engine. That is, the time length of each step width decreases as the engine rotational speed increases. Consequently, if the capacitance and hence the time constant of the integration circuit 15 is fixed, as in the above-described embodiment, the extent of smoothing out of the stepped wave of the D/A converter output also varies depending upon the engine speed. Therefore, it is difficult to smoothen the stepped output voltage of the D/A converter 4 to a sufficient extent over a wide range of the engine speed from a low to a high speed. For example, if the capacitance of the integration circuit 4 is large enough to obtain an appropriate smooth curve (i.e., not too steep and not too dull) at low engine speeds, it is impossible to sufficiently smoothen the D/A converter output at high engine speeds (i.e., the curve is too steep and sharp), whereas if the capacitance is small enough to obtain a smooth curve at high engine speeds, difficulty is met in which the curve obtained at low engine speeds is too dull, thus leaving stepwise or discontinuous changes in the D/A converter output. Accordingly, a certain compromise is required for setting the capacitance of the integration circuit 15 to a value suitable for both low and high engine speeds. In fact, it is preferable that the capacitance be appropriately set for low engine speeds since the smoothing out of the D/A converter output is much more required for low-speed operation of the engine rather than for high-speed operation.

On the other hand, in order to sufficiently smoothen the stepped output voltage of the D/A converter 4 over a wide range of engine speed, it is necessary to make the time constant or capacitance of the integration circuit 15 larger during low speeds but smaller during high speeds. If, however, the time constant is to be switched using the number of revolutions per minute of the engine, the circuit arrangement for this purpose will be complicated and expensive. In order to cope with this problem, according to the present invention, it is considered to utilize the fact that the output voltage Vs of the function-generation circuit 6 is high at low speeds of the engine (at a small throttle opening) and low at high speeds (at a large throttle opening), as shown in FIg. 7. Specifically, if the stepped output voltage Vs changes smoothly only in a relatively narrow range in the vicinity of Vs, it is possible to control ignition timing in a continuous manner. To this end, in the present invention, the time constant (i.e., capacitance) of the integration circuit is changed or switched in accordance with the output of the counter 3 so that it can be made larger for the higher portion of the stepped output voltage (which corresponds to Vs at low speeds) and similar for the lower portion thereof (which corresponds to Vs at high speeds). Consequently, the output voltage of the D/A converter 4 thus modified by the integration circuit has a high-voltage portion which changes smoothly at low speeds for comparison with Vs, and a low-voltage portion which changes smoothly at high speeds for comparison with Vs.

Thus, a smoothly changing analog voltage, which varies in accordance with the rotational speed of the engine, can be obtained at the non-inverted input terminal of the comparator 12 so that ignition timing can be controlled in a smoothly changing analog fashion continuously from a low speed to a high speed range.

Figure 3:
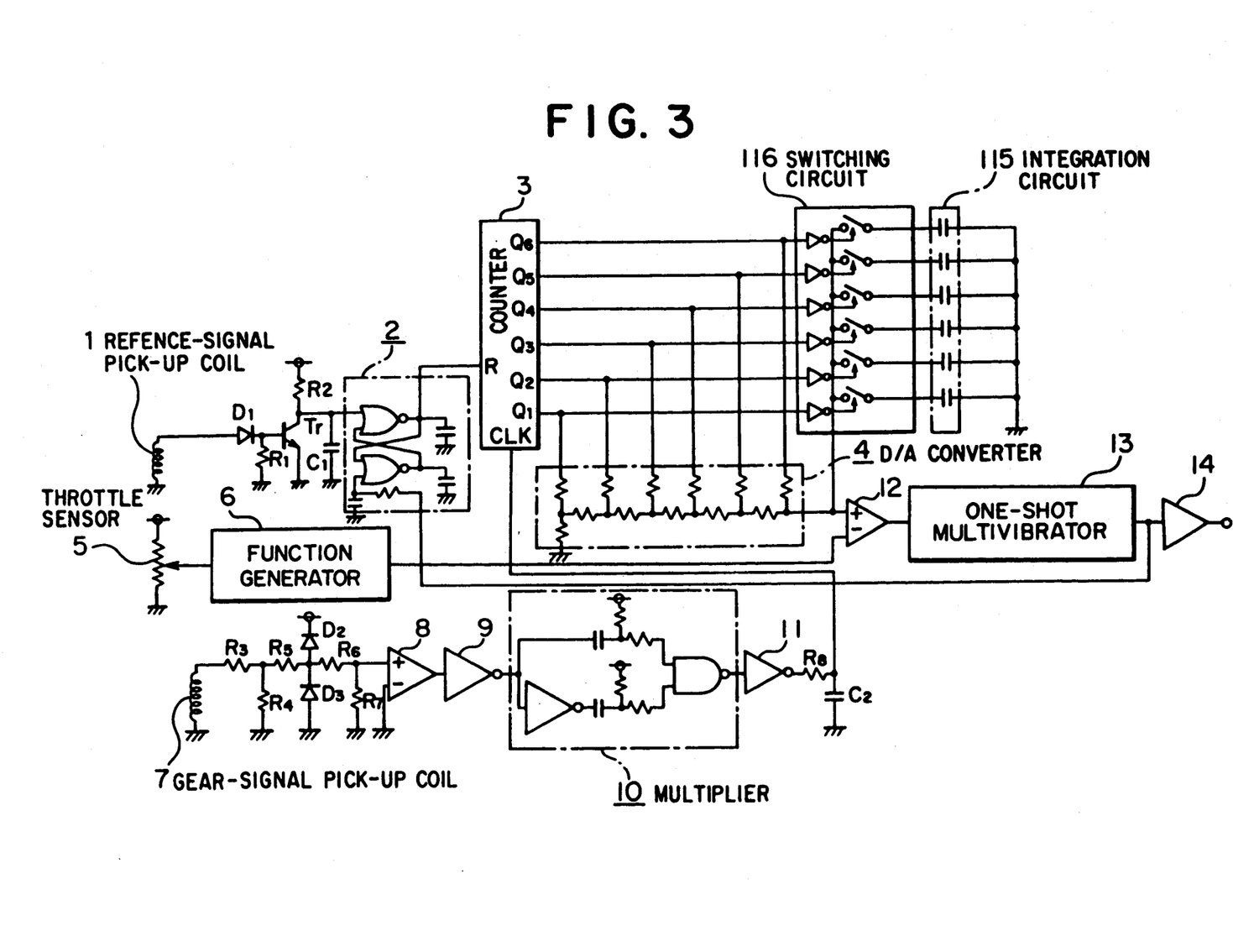
FIG. 3 is a view similar to FIG. 1, but showing another ignition timing control circuit of the present invention.

FIG. 3 illustrates another embodiment of the present invention which is intended to improve the above problem. This embodiment is substantially similar in arrangement and operation to the previous one except for the following: an integration circuit 115 has a variable time constant in the form of a variable capacitance and a switch circuit 116 is provided for changing the time constant or capacitance of the integration circuit 115 in response to a change in the output level of the counter 3. The other components of this embodiment are the same as those employed in the previous embodiment and hence identified with the same reference numerals.

The integration circuit 115 includes a plurality of capacitors corresponding in number to the output terminals $Q_1 \sim Q_6$ of the counter 3. The switch circuit 116 includes a plurality of switch elements and a plurality of inverters which correspond in number to the capacitors. Each of the capacitors of the integration circuit 115 is grounded at their one side and connected at their opposite side through the corresponding switch element to a conductor connecting between the output terminal of the D/A converter 4 and the positive input terminal of the comparator 12. Each of the switch elements is operated to open and close by means of the corresponding inverter which is connected to the corresponding output terminal of the counter 3 so that each switch element is closed when the output of the corresponding output terminal of the counter 7 goes to the high level. Thus, the time constant or the entire capacitance of the integration circuit 115 can be varied by controlling the opening or closing condition of each switch element of the switch circuit 116.

FIGS. 4(a) through 4(i) show the operational waveforms of the output signals of the respective elements of FIG. 3.

Figure 4A:
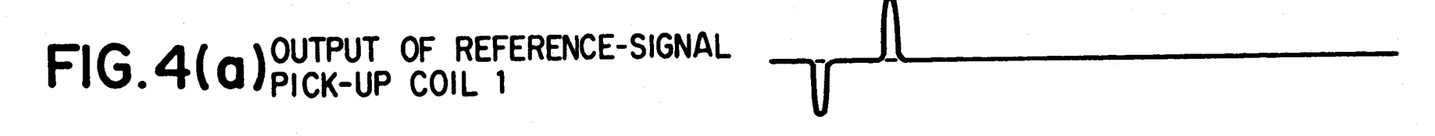
FIGS 4(a) through 4(f) are diagramatic views similar to FIGS. 2(a) through 2(g), but showing the waveforms of essential operational elements of FIG. 3.
Figure 4B:
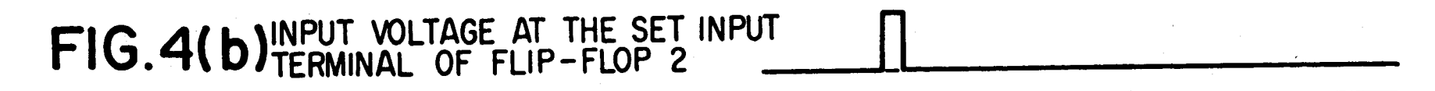
Figure 4C:
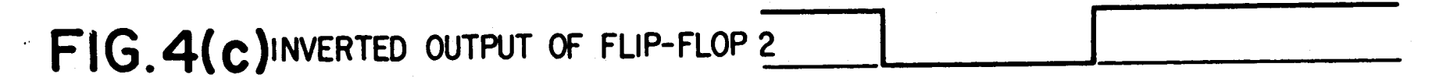

With the above constructed embodiment, as the magneto genarator (not shown) is operated to rotate, the reference signal pick-up coil 1 produces a pulse signal including a pair of negative and positive pulses per engine revolution, as illustrated in FIG. 4(a), the positive pulses being imposed on the base of the transistor Tr through the diode $D_1$ so as to be shaped in their waveform to provide rectangular-shaped pulses as illustrated in FIG. 4(b). The pulses thus waveform shaped are input to the set input terminal of the flip-flop 2 so that the output level at the inverted output terminal of the flip-flop 2 becomes low as illustrated in FIG. 4(c), thus setting the counter 3 in operation.

Figure 4D:
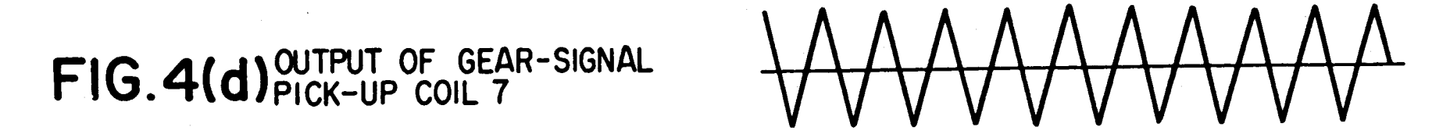
Figure 4E:
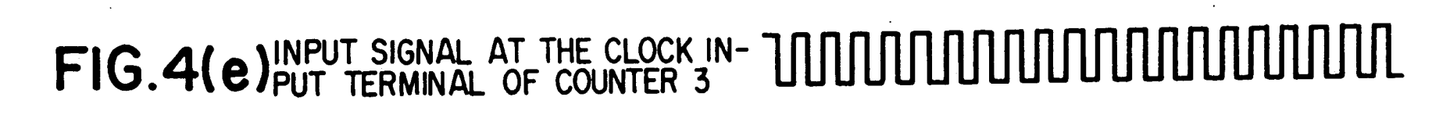
Figure 4F:
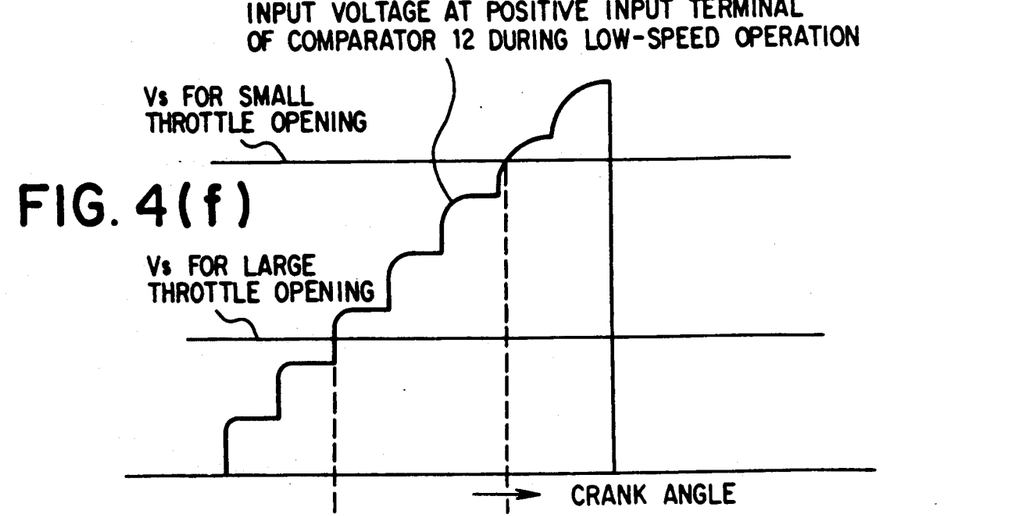
Figure 4G:
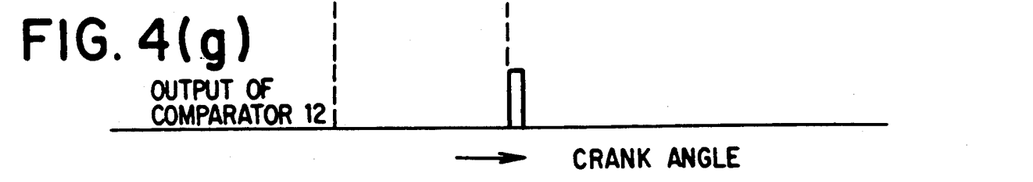
Figure 4H:
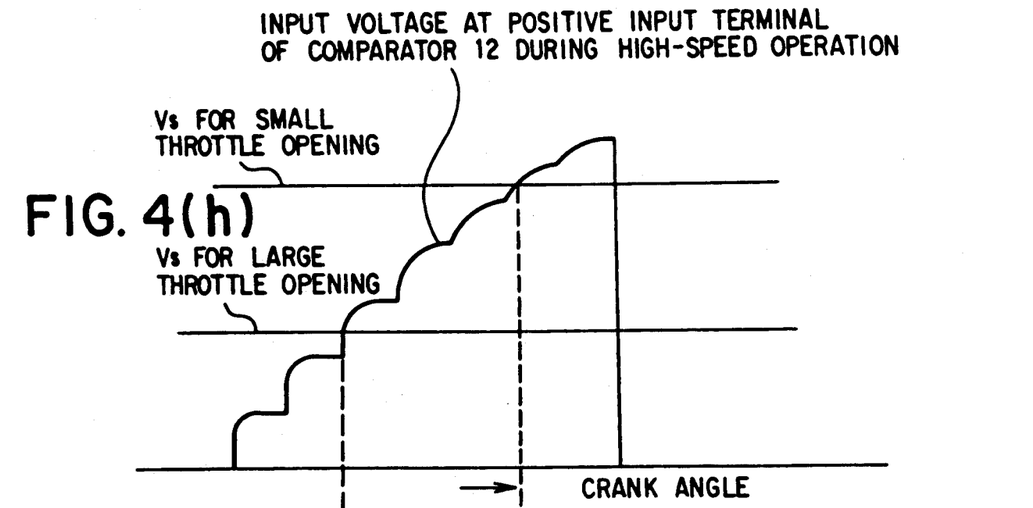
Figure 4I:
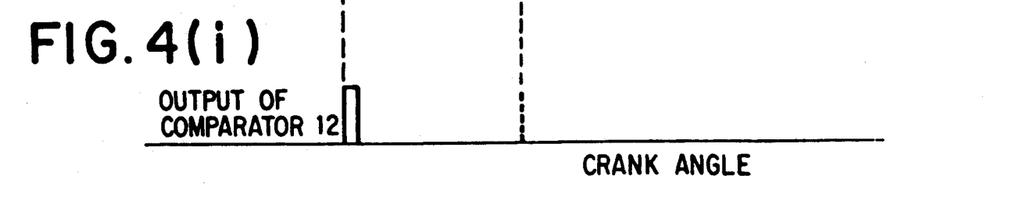

On the other hand, the gear-signal pick-up coil 7 produces a saw-tooth wave, as illustrated in FIG. 4(d), which is imposed on the comparator 8 and subjected to waveform shaping. The output of the comparator 8 thus shaped is fed through the inverted amplifier 9 to the twofold multiplier 10 so as to provide clock pulses, as illustrated in FIG. 4(e), which are then input to the clock input terminal CLK of the counter 3. As the counter 3 counts the input clock pulses, it sequentially produces at its output terminals $Q_1 \sim Q_6$ a digitalized voltage in the form of a binary number representative of the number of the counted clock pulses. The digitalized output voltage of the counter 3 is then converted into an analog voltage by the D/A converter 4. On the other hand, each of the switch elements of the switch circuit 16 is opened by the corresponding inverter when the output of the corresponding output terminal of the counter 3 is high, but closed when the output of the corresponding output terminal of the counter 3 is low. Thus, the respective switch elements are sequentially opened and closed depending upon the output levvel of the counter 3 to thereby control the number of operating capacitors and hence the total capacitance of the integrator 115. Therefore, the total capacitance of the integrator 115 increases in accordance with the increasing output level of the counter 3. In other words, the total capacitance of the integrator 115 increases in accordance with the increasing output voltage of the function generator 6 which changes with respect to the output of the throttle sensor 5 in the manner as shown in FIG. 7. This means that the total capacitance of the integrator 115 generally increases as the throttle sensor output (engine load or speed) decreases. Also, the capacitance of the integrator 115 relatively decreases in accordance with the increasing rotational speed of the engine since the period of time corresponding to a definite angular width of the crankshaft decreases as the engine speed increases. This is clearly shown in FIGS. 4(f) and 4(h) in which FIGS. 4(f) and 4(h) show the waveform of the output voltage of the D/A converter 4 integrated by the integrator 115 during the low-speed operation of the engine and during the high-speed operation thereof, respectively. From FIG. 4(f), it is clearly seen that the waveform of the D/A converter output is appropriately shaped or smoothed out from a stepped form into a smoothly curved form at a relatively high-voltage range in the vicinity of Vs for small throttle openings (the low-load operating range of the engine) whereas the smoothing out is not good or satisfactory at a relatively low-voltage range. Also, it is clear from FIG. 4(h) that the D/A converter output is appropriately waveform shaped or smoothed out at a relatively low-voltage range in the vicinity of Vs for large throttle openings (the high-load operating range) whereas too much smoothing takes place. Here, it is to be noted that it is sufficient to appropriately smoothen the stepped D/A converter output in the high-voltage range near Vs for small throttle openings during the low-speed operation of the engine, but in the low-voltage range near Vs for large throttle openings during the high-speed operation.

As a result, the output voltage of the D/A converter 4 is integrated depending upon the total capacitance (i.e., the time constant) of the integration circuit 15 so that it is accordingly smoothed out to provide a smoothly-changing curve, as illustrated in FIG. 4(f) or FIG. 4(h). The integrated voltage is imposed on the non-inverted input terminal of the comparator 12 which hsa the inverted input terminal fed with the output voltage Vs of the function-generator 6 which is produced based upon the output voltage of the throttle sensor 5.

Accordingly, the analog voltage, which is substantially continuously and smoothly changing as clearly shown in FIG. 4(f) or FIG. 4(h), is compared with the output voltage Vs of the function generator 6 by means of the comparator 12. When the analog voltage becomes higher than the output voltage Vs, the output level of the comparator 12 goes high so that the one-shot multivibrator 13 is triggered to generate an output pulse which is then amplified by the amplifier 14 to form an ignition control signal. At the same time, the output signal of the one-shot multivibrator circuit 13 is also fed to the reset input terminal of the flip-flop 2 so that the flip-flop 2 is reset to return its output to the high level, as shown in FIG. 4(c). As a result, the counter 3 is reset to stop counting and made ready for the next counting.

What is claimed is:

1. An ignition timing control circuit for an internal combustion engine, comprising:
    a load sensor (5,6) for sensing the load condition of said engine and generating an output signal representative of the sensed load condition;
    reference-signal generating means (1,2) for generating a reference signal;
    a clock pulse generator (7-11) for generating clock pulses in accordance with the rotation of the engine;
    a counter (3) operable to start the counting of the clock pulses generated by clock pulse generator when said reference-signal generator generates a reference signal, said counter outputting a digitalized output representative of the number of the counter clock pulses;
    a digital to analog converter (4) for converting the digitalized output of said counter into an analog voltage having a stepped waveform;
    an integrator connector to said digital to analog converter for integrating and smoothing out the stepped output voltage of said digital to analog converter; and
    a comparator (12) for comparing the output voltage of said integrator and the output voltage of said load sensor and generating an output signal for controlling the ignition timing of said engine in accordance with the result of comparison,
    wherein said integrator comprises a capacitor (15) having a fixed time constant, and wherein said capacitor has one terminal coupled to the output terminal of said digital to analog converter and the other terminal grounded.

2. An ignition timing control circuit as claimed in claim 1, wherein said integrator has a variable time constant.

3. An ignition timing control circuit for an internal combustion engine, comprising:
    a load sensor (5,6) for sensing the load condition of said engine and generating an output signal representative of the sensed load condition;
    reference-signal generating means (1,2) for generating a reference signal;
    a clock pulse generator (7-11) for generator clock pulses in accordance with the rotation of the engine;
    a counter (3) operable to start the counting of the clock pulses generated by said clock pulse generator when said reference-signal generator generates a reference signal, said counter outputting a digitalized output representative of the number of the counted clock pulses;
    a digital to analog converter (4) for converting the digitalized output of said counter into an analog voltage having a stepped waveform;
    an integrator connected to said digital to analog converter for integrating and smoothing out the stepped output voltage of said digital to analog converter; and
    a comparator (12) for comparing the output voltage of said integrator and the output voltage of said load sensor and generating an output signal for controlling the ignition timing of said engine in accordance with the result of comparison,
    wherein said load sensor comprises:
    a throttle sensor (5) for sensing the opening degree of a throttle valve and generating an output voltage representative of the sensed throttle valve opening degree; and
    a function generator (6) for generating an output voltage as a function of the output signal of said throttle sensor, said comparator generating an output signal based on a comparison between the output voltage of said integrator and the output voltage of said function generator.

4. An ignition timing control circuit as claimed in claim 3, wherein said integrator has a fixed time constant.

5. An ignition timing control circuit as claimed in claim 4, wherein said integrator comprises a capacitor (15).

6. An ignition timing control circuit as claimed in claim 5, wherein said capacitor has one terminal coupled to the output terminal of said digital to analog converter and the other terminal grounded.

7. An ignition timing control circuit for an internal combustion engine, comprising:
    a load sensor (5,6) for sensing the load condition of said engine and generating an output signal representative of the sensed load condition;
    reference-signal generating means (1,2) for generating a reference signal;

a clock pulse generator (7-11) for generating clock pulses in accordance with the rotation of the engine;

a counter (3) operable to start the counting of the clock pulses generated by said clock pulse generator when said reference-signal generator generates a reference signal, said counter outputting a digitalized output representative of the number of the counted clock pulses;

a digital to analog converter (4) for converting the digitalized output of said counter into an analog voltage having a stepped waveform;

an integrator connected to said digital to analog converter for integrating and smoothing out the stepped output voltage of said digital to analog converter; and a comparator (12) for comparing the output voltage of said integrator and the output voltage of said load sensor and generating an output signal for controlling the ignition timing of said engine in accordance with the result of comparison, wherein said integrator (115) has a variable time constant.

8. An ignition timing control circuit as claimed in claim 7, wherein said integrator comprises a plurality of capacitors which are connected to said digital to analog converter through a switch (116).

9. An ignition timing control circuit as claimed in claim 8, wherein said counter has a plurality of output terminals, and said capacitors have one terminal commonly grounded and the other terminal coupled with the digital to analog converter through said switch.

10. An ignition timing control circuit as claimed in claim 9, wherein said switch comprises a plurality of switch elements for sequentially connecting the corresponding capacitors to the digital to analog converter when said counter generates output signals at its corresponding output terminals.

11. An ignition timing control circuit as claimed in claim 9, wherein said counter has a clock-pulse input terminal coupled to a crank angle sensor (7) of said clock pulse generator through a multiplier (10), and a reset terminal, and wherein said reference signal generator comprises:

a reference-signal pick-up coil (1) for generating a reference signal; and a flip-flop (2) having a set input terminal coupled through a waveform shaper to said reference-signal pick-up coil and an output terminal coupled to the reset terminal of said counter, said flip-flop further having a reset terminal connected to receive the output signal of said comparator through a one-shot multivibrator (13).

12. An ignition timing control circuit as claimed in claim 7, wherein said load sensor comprises:

a throttle sensor (5) for sensing the opening degree of a throttle valve and generating an output voltage representative of the sensed throttle valve opening degree; and a function generator (6) for generating an output voltage as a function of the output signal of said throttle sensor, said comparator generating an output signal based on a comparison between the output voltage of said integrator and the output voltage of said function generator.

13. An ignition timing control circuit for an internal combustion engine, comprising:

a load sensor (5,6) for sensing the load condition of said engine and generating an output signal representative of the sensed load condition;

reference-signal generating means (1,2) for generating a reference signal;

a clock pulse generator (7-11) for generating clock pulses in accordance with the rotation of the engine;

a counter (3) operable to start the counting of the clock pulses generated by said clock pulse generator when said reference-signal generator generates a reference signal, said counter outputting a digitalized output representative of the number of the counted clock pulses;

a digital to analog converter (4) for converting the digitalized output of said counter into an analog voltage having a stepped waveform;

an integrator connected to said digital to analog converter for integrating and smoothing out the stepped output voltage of said digital to analog converter; and a comparator (12) for comparing the output voltage of said integrator and the output voltage of said load sensor and generating an output signal for controlling the ignition timing of said engine in accordance with the result of comparison, wherein said counter has a clock-pulse input terminal coupled to a crank angle sensor (7) of said clock pulse generator through a multiplier (10), and a reset terminal, and wherein said reference signal generator comprises:

a reference-signal pick-up coil (1) for generating a reference signal; and a flip-flop (2) having a set input terminal coupled through a waveform shaper to said reference-signal pick-up coil and an output terminal coupled to the reset terminal of said counter, said flip-flop further having a reset terminal connected to receive the output signal of said comparator through a one-shot multivibrator (13).

* * * * *